US009659342B2

(12) United States Patent
Nalluri et al.

(10) Patent No.: US 9,659,342 B2
(45) Date of Patent: May 23, 2017

(54) MID COMMAND BUFFER PREEMPTION FOR GRAPHICS WORKLOADS

(71) Applicants: Hema Chand Nalluri, Hyderabad (IN); Aditya Navale, Folsom, CA (US); Murali Ramadoss, Folsom, CA (US); Jeffery S. Boles, Folsom, CA (US)

(72) Inventors: Hema Chand Nalluri, Hyderabad (IN); Aditya Navale, Folsom, CA (US); Murali Ramadoss, Folsom, CA (US); Jeffery S. Boles, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 301 days.

(21) Appl. No.: 13/931,915

(22) Filed: Jun. 29, 2013

(65) Prior Publication Data

US 2015/0002522 A1    Jan. 1, 2015

(51) Int. Cl.
  *G06F 9/48*  (2006.01)
  *G06T 1/60*  (2006.01)
  *G06T 1/20*  (2006.01)

(52) U.S. Cl.
  CPC ............... *G06T 1/60* (2013.01); *G06F 9/48* (2013.01); *G06F 9/485* (2013.01); *G06T 1/20* (2013.01)

(58) Field of Classification Search
  None
  See application file for complete search history.

(56) References Cited

U.S. PATENT DOCUMENTS

| | | | |
|---|---|---|---|
| 6,747,657 B2* | 6/2004 | Doyle et al. | ........ 345/537 |
| 7,173,627 B2* | 2/2007 | Doyle et al. | ........ 345/501 |
| 7,545,381 B2 | 6/2009 | Huang et al. | |
| 7,580,040 B2 | 8/2009 | Huang et al. | |
| 2003/0001848 A1 | 1/2003 | Doyle et al. | |
| 2004/0230975 A1* | 11/2004 | Gewirtz | ....... G06F 8/458 718/100 |
| 2007/0257935 A1* | 11/2007 | Koduri et al. | ........ 345/611 |
| 2009/0178045 A1 | 7/2009 | Gupta et al. | |

(Continued)

OTHER PUBLICATIONS

PCT/US2014/042972, "Notification of Transmittal of the International Search Report and the Written Opinion of the International Searching Authority, or the Declaration" mailed Oct. 30, 2014, pp. 10.

(Continued)

*Primary Examiner* — Xiao Wu
*Assistant Examiner* — Steven Elbinger
(74) *Attorney, Agent, or Firm* — Blakely, Sokoloff, Taylor & Zafman LLP

(57) ABSTRACT

Mid-command buffer preemption is described for graphics workloads in a graphics processing environment. In one example, instructions of a first context are executed at a graphics processor, the first context has a sequence of instructions in an addressable buffer and at least one of the instructions is a preemption instruction. Upon executing the preemption instruction, execution of the first context is stopped before the sequence of instructions is completed. An address is stored for an instruction with which the first context will be resumed. The second context is executed, and upon completion of the execution of the second context, the execution of the first context is resumed at the stored address.

21 Claims, 8 Drawing Sheets

(56) References Cited

U.S. PATENT DOCUMENTS

| | | | |
|---|---|---|---|
| 2011/0050713 A1 | 3/2011 | McCrary et al. | |
| 2011/0063311 A1* | 3/2011 | McCrary et al. | 345/522 |
| 2012/0139930 A1 | 6/2012 | Rogers et al. | |
| 2012/0194527 A1 | 8/2012 | Hartog et al. | |
| 2013/0117760 A1 | 5/2013 | Cuadra et al. | |
| 2013/0124838 A1 | 5/2013 | Shah et al. | |
| 2013/0246736 A1* | 9/2013 | Hontani | 712/30 |

OTHER PUBLICATIONS

European Search Report from counterpart European Patent Application No. EP 14817593, dated Dec. 8, 2016, 9 pages.

Kato, et al., "Operating Systems Challenges for GPU Resource Management," Jan. 1, 2011, 10 pages.

* cited by examiner

MID COMMAND BUFFER PREEMPTION FOR GRAPHICS WORKLOADS

BACKGROUND

In a computing environment with an Operating System (OS), a CPU (Central Processing Unit), a GPU (Graphics Processing Unit), a graphics driver, and a graphics memory, the OS schedules workloads from multiple clients to the GPU. These workloads are referred to herein as contexts. Some contexts are so massive that they demand a non-trivial amount of execution time on the GPU. Some contexts are very time sensitive and should be executed almost immediately. Striking a balance across multiple contexts and the management of the GPU helps to maintain a pleasing end user experience.

The OS has techniques for graphics workflow management. Based on these workflow management techniques, the OS schedules the contexts, typically based on user inputs, time slicing, priority etc. The workload for each context is submitted as a DMA (Direct Memory Access) buffer to a software graphics driver. The graphics driver creates GPU-specific command buffers for execution called batch buffers. The GPU-specific batch buffers are queued to the GPU hardware for execution. A typical batch buffer include many commands, which constitute the workload. The batch buffer commands may keep a GPGPU (General Purpose Graphics Processing Unit) occupied for a long time, for example for several milliseconds.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

When a time sensitive context appears, the OS scheduler may preempt the execution of the queued batch buffers in the GPU. The currently running context may be canceled and the execution of the new time sensitive context may then be started. This allows the context to switch to the time critical context as soon as possible. Alternatively, the currently running context may be allowed to be completed before the context switch. The preemption response time of the GPU, that is the speed at which the GPU can switch from one context to another can significantly affect the end user experience. When there is a context switch, any preempted contexts are rescheduled for later execution by the OS scheduler.

When preemption is limited to batch buffer boundaries, that is when the currently executing batch buffer completes before a context switch, then there can be a multiple millisecond delay before a time sensitive context is executed. This amount of latency in switching from executing one context to executing another may be perceptible to users.

By supporting mid command buffer preemption for GPU workloads, the latency for time sensitive contexts is reduced. This provides better, that is shorter, preemption latencies leading to a better user experience. Preempting the ongoing context in the middle of a batch buffer and switching to a new context gives a better preemption response time. If the GPU also provides the necessary hooks to the software, for example, the scheduler, then the preempted workload can be resubmitted after the time sensitive context is completed. In this way, the preempted workload can resume execution from the point at which it was preempted.

Ring Buffer

Figure 1:
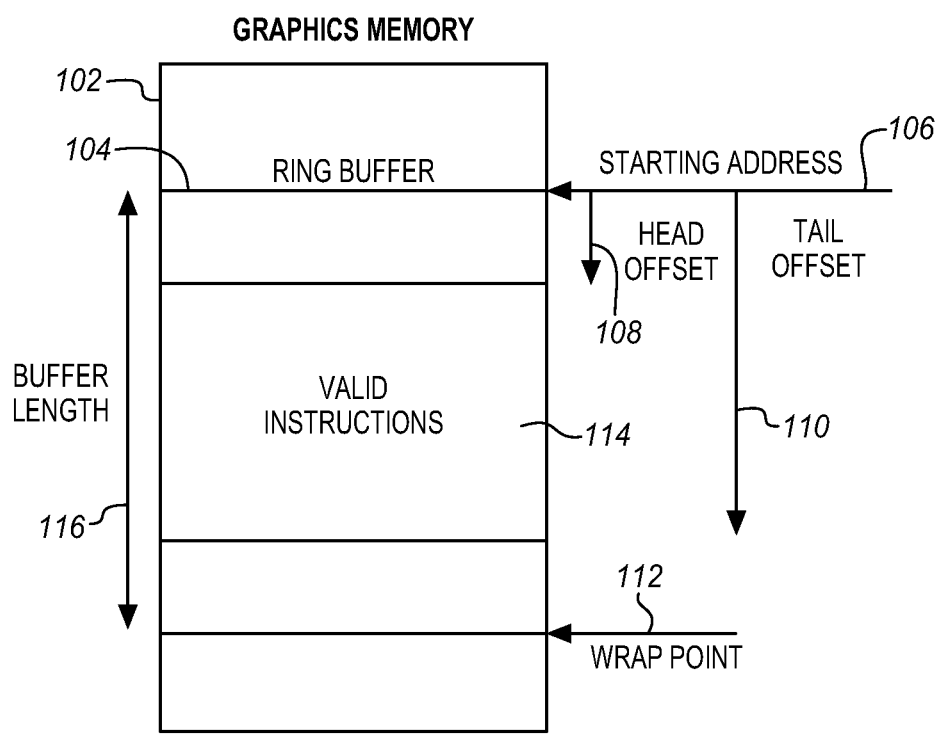
FIG. 1 is a diagram of a portion of the instructions in a graphics memory including a ring buffer.

In some implementations a GFX (Graphics) Driver submits workloads to the hardware of the GPU or a GPGPU by populating a ring buffer. FIG. 1 is a diagram of a portion of graphics memory 102 that includes a ring buffer 104 within the graphics memory. The ring buffer is a circular memory buffer 104 that has been allocated a particular buffer length 116 within the graphics memory 102. The buffer length refers to the difference between the first address or the start address 106 and the last address or the wrap point 112 of the ring buffer within the addresses of the graphics memory 102. The ring buffer is managed by scheduling software using a start address 106, ring control, head offset 108, and tail offset 110 pointers. The graphics hardware executes commands in the ring buffer in sequence and uses the offset pointers to track execution locations.

The start address register 106 contains the starting address of the ring buffer in the graphics memory. This allows the ring buffer to be identified and distinguished from the rest of the graphics memory. A ring buffer control register 116 in the graphics memory provides the length 116 of the ring buffer from the start address to the wrap point. The ring buffer control register may be in the ring buffer after the start address or it may be stored in a separate section that maps out the graphics memory allocations.

The ring buffer contains valid instructions 114 inserted into the ring buffer by the scheduler. These instructions are to be executed by the GPU or a GPGPU or other processor. As shown the ring buffer is not filled with valid instructions. Typically there is some unused space so that the buffer does not become full.

A head pointer 108 states the offset from the ring buffer start address to the first instruction to be executed. The head pointer value is tracked by the graphics hardware and gets updated after the execution of a command. In this way, the head offset pointer is also an indication of the progress as it is made by the graphics hardware. A tail pointer 110 provides the offset from the ring buffer start address to the end of the ring buffer. The tail offset gets updated by the scheduling software and indicates the last valid command that needs to be executed in the circular buffer. In some embodiments, the head pointer and the tail pointer wrap on hitting the maximum ring buffer length. As a result, the tail pointer offset may point to an address above that of the head offset. Execution will continue through the end of the buffer and wrap to the start address to meet the tail offset.

When the head pointer is updated after execution of a command and is then equal to the tail pointer, then all of the instructions have been executed and the graphics hardware stops executing the ring buffer. The tail pointer is further updated by scheduling software on appending a new workload to the ring buffer. As additional workloads are added to the ring buffer, the tail pointer continues to move away from the head pointer. As long as workloads are added as fast as or faster than the graphics hardware executes workloads, then the tail pointer will move away from the head pointer as fast as or faster than the head pointer is moved toward the tail pointer.

Preemption

Execution of an ongoing workload in the ring buffer can be preempted to allow a time sensitive context to be executed. The preemption of the ongoing workload in the GPU may be implemented as an asynchronous process. The scheduling software first indicates a new preemption request to the GPU by updating a UHPTR (update head pointer) MMIO (Memory Mapped Input/Output) register with a new jump location in the ring buffer. The jump location indicates a location with a start of an instruction sequence that is to be executed. As a result, when the hardware detects the UHPTR programmed it must stop executing the ongoing workload on an appropriate command boundary and jump to the new location in the ring buffer that is stated by the UHPTR.

In the example embodiment, the UHPTR is sampled by the GPU on executing an arbitration command, in this example called MI_ARB_CHK, in the command sequence. This command is placed in a context for the purpose of causing the process to check the update head pointer. The arbitration command is placed in positions at which the command stream may safely be interrupted. On executing the MI_ARB_CHK command, the GPU will determine whether the UHPTR is valid. If so, then it stops and terminates or preempts the current execution process. It then updates the ring buffer head pointer with the value provided in UHPTR. The GPU also samples the head offset in the ring buffer corresponding to the MI_ARB_CHK command on which the preemption has occurred and saves the head offset as the contents of a preemption register, here called the RING_BUFFER_HEAD_PREEMPT_REG register.

The GPU then starts execution from the updated Head Pointer location. The MI_ARB_CHK command may be instrumented by the software scheduler in the command sequence before submitting the command sequence of a new workload to the GPU using the ring buffer.

Figure 2:
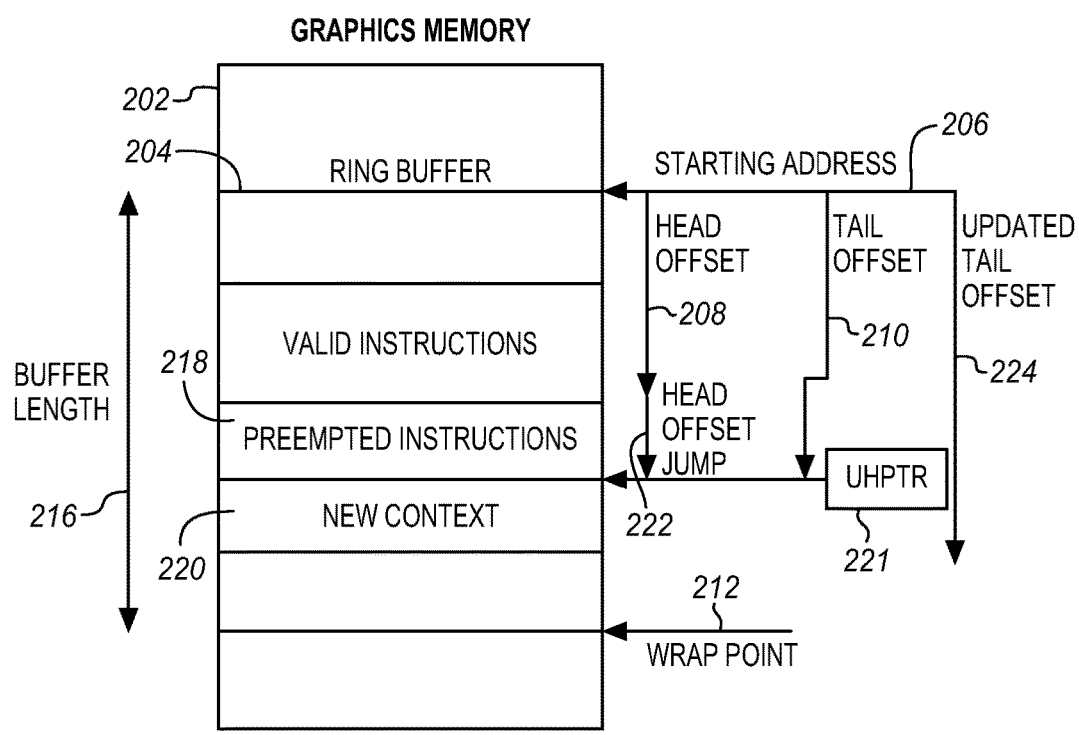
FIG. 2 is a diagram of a portion of the instructions in a graphics memory including a ring buffer with preempted instructions according to an embodiment of the present invention.

FIG. 2 is a diagram of the graphics memory 202 that includes a ring buffer 204. The ring buffer is defined as in FIG. 1 by a start address 206, a buffer length 216, and a wrap point 212. As in the example of FIG. 1, execution positions in the ring buffer are tracked using a head offset pointer 208, and a tail offset pointer 210.

As shown in FIG. 2, the ring buffer includes a set of valid instructions 214, similar to the instructions 114 of FIG. 1. These valid instructions include a portion that are preempted instructions 218. The instructions have been preempted by a new context 220. For any of a variety of reasons, the scheduler has determined that the new instructions are more urgent than completing the valid instructions. In the diagram of FIG. 2, the vertical position of the group of instructions corresponds to the register address offset from the start address 206.

The diagram represents a particular execution time at which execution has been preempted. The header offset pointer 208 points to the end of the valid instructions 214 immediately before the preempted instructions. There is then a header offset jump 222 to the start of the new instructions 220 based on the value in the UHPTR 221. This shows that as a result of the preemption, the head offset has jumped forward to a value corresponding to the new instructions in the ring buffer. This causes the instructions in between these two points to be preempted. As described in more detail below, the tail offset is also updated 224 to accommodate the new context 220.

Figure 3:
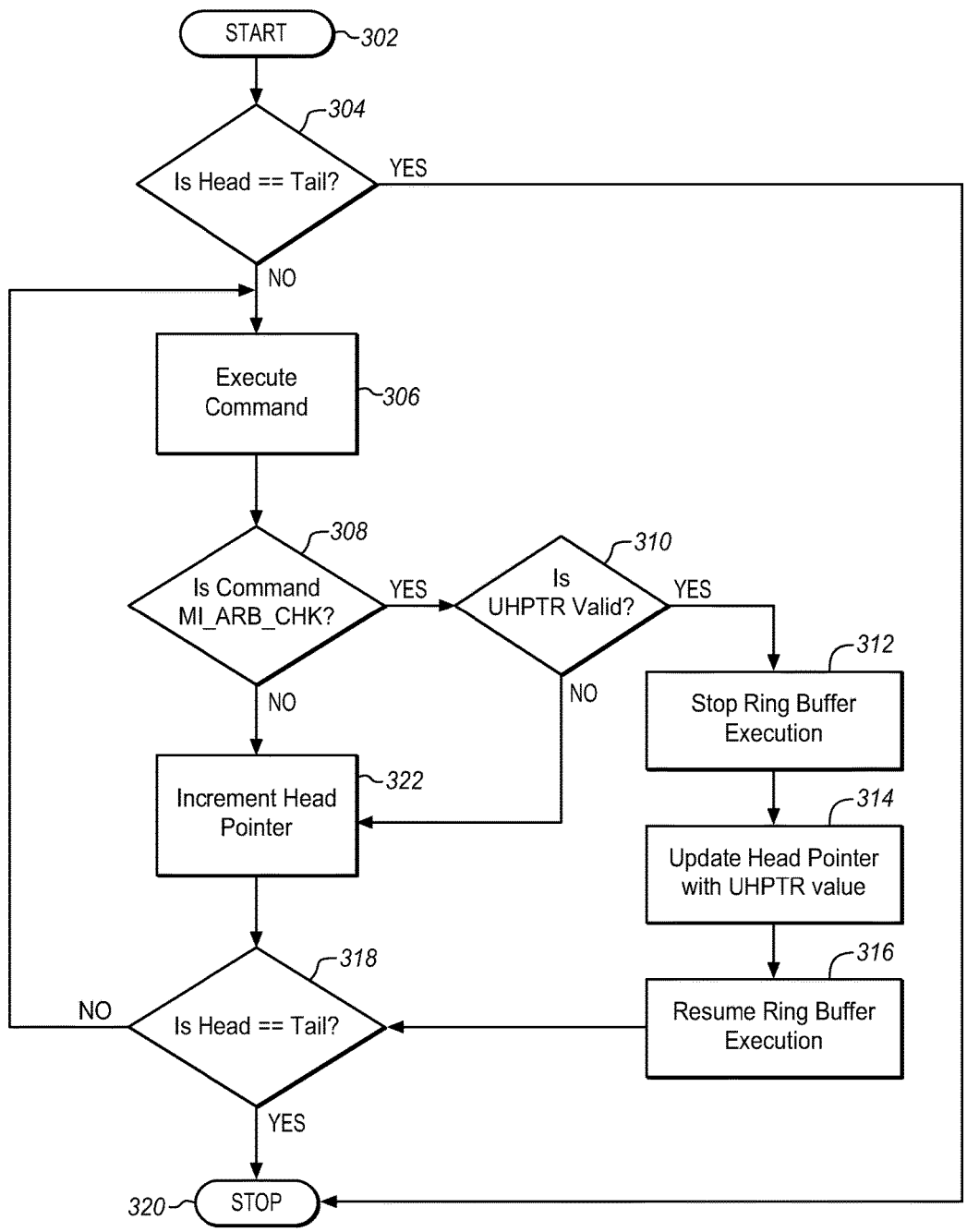
FIG. 3 is a process flow diagram of batch buffer execution and preemption using a ring buffer according to an embodiment of the present invention.

FIG. 3 is a process flow diagram of batch buffer execution and preemption using a ring buffer. At 302 a start command is executed by the GPU and the GPU first determines whether there are any commands in the ring buffer. At 304, the GPU determines whether the head offset is equal to the tail offset. If so, then the ring buffer is empty and the process stops 320. It begins again with another start command 302. If the tail offset is distanced from the head offset, then there are instructions to execute at addresses between the head offset pointer and the tail offset pointer. At 306 the GPU starts to execute those instructions.

Upon reaching the arbitration command, MI_ARB_CHK 308 in the instruction stream of the ring buffer, the GPU checks to determine if there is a valid address in the update head pointer, UHPTR, at 310. With a valid UHPTR, the GPU stops executing the ring buffer at 312. The GPU samples the ring buffer's graphics memory address corresponding to the MI_ARB_CHK command on which preemption has occurred to a ring buffer preemption address register, here called RING_BUFFER_PREEMPT_ADDR_REG register, at 314. The RING_BUFFER_PREEMPT_ADDDR_REG register is used in this example to store the ring buffer head offset address at which an instruction sequence was interrupted in the ring buffer. The GPU can later return to this register to resume processing at the point in the batch buffer at which it left off.

At 314, the GPU updates the ring buffer head pointer with the value provided in UHPTR. Then at 316, the GPU starts execution from the updated Head Pointer location. This location will correspond to the new context 220 that the scheduler added to the ring buffer. Execution continues and the GPU after each instructions determines whether there are any further instructions at 318. If so then execution continues as described above and the GPU executes the next command at 306. If the next command is not the MI_ARB_CHK command at 308, then the GPU increments the head pointer 322 and checks to determine whether there are any further commands at 318.

As shown in FIG. 3, if there are commands to execute at 318, the GPU will execute commands at 306, increment the head pointer at 322, check the incremented head pointer against the tail pointer at 318 and continue to execute commands at 306 if and until the ring buffer is emptied. The process is interrupted only for the MI_ARB_CHK commands at 308 and then only if the command has a valid UHPTR value at 310. This register value points to the new context. Without this information, the context is not preempted.

Mid Batch Buffer Preemption

Figure 4:
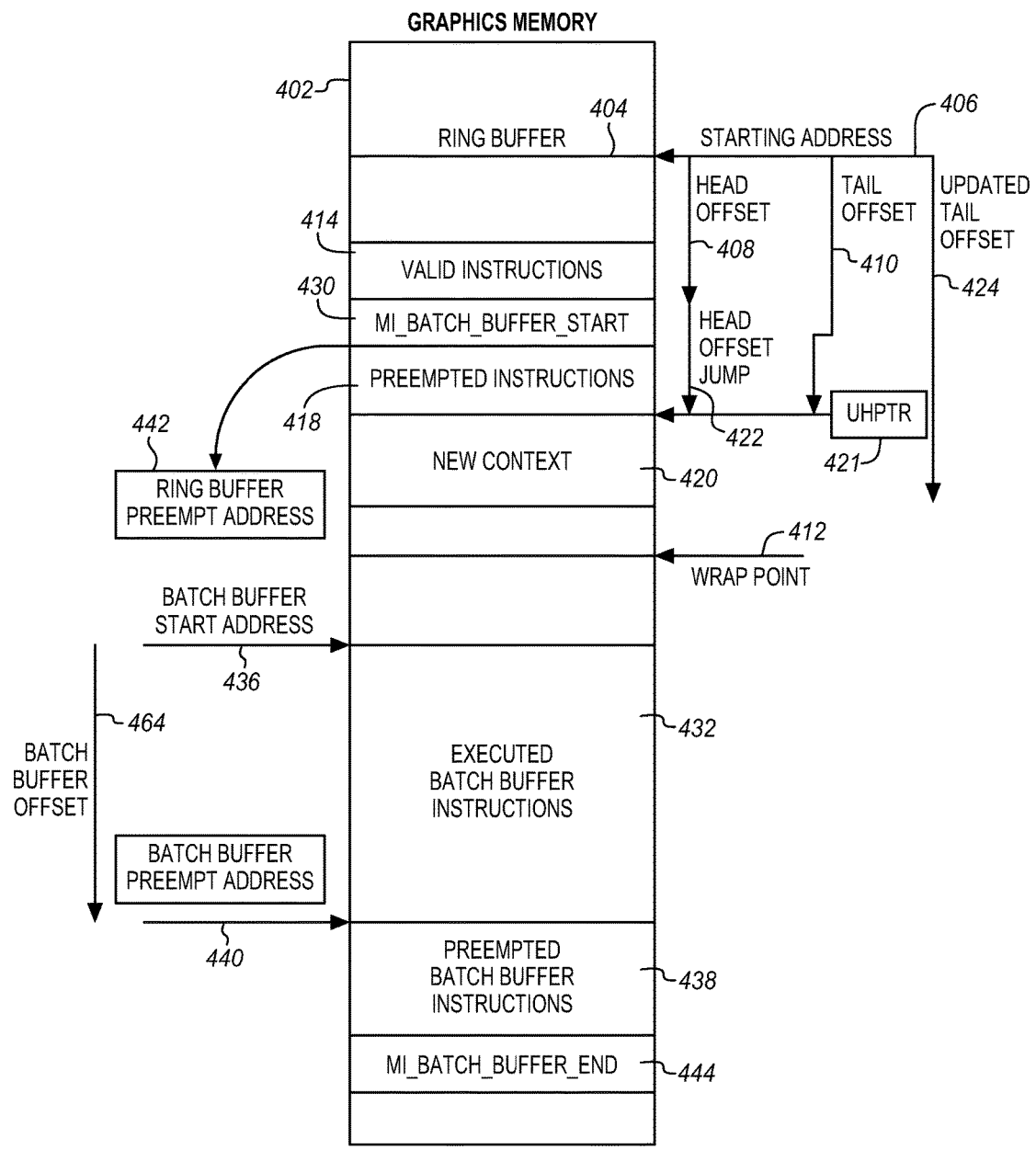
FIG. 4 is a diagram of a portion of the instructions in a graphics memory including a ring buffer with preempted instructions and a batch buffer according to an embodiment of the present invention.

Batch Buffers may be programmed in the ring buffer via a start command, referred to herein as MI_BATCH_BUFFER_START command. FIG. 4 is a diagram of preempting a context from the middle of a batch buffer. The graphics memory 402 has a ring buffer 404, the extent of which is defined with a starting address 406 and a wrap point 412. Within the ring buffer are valid instructions 414 to be executed by the GPU. The GPU tracks its position within the buffer using a head offset 408, indicating the offset from the start address 406 of the address of the next instruction to be executed. A tail offset 410 indicates the offset from the start address of the last instruction to be executed in the ring buffer.

The scheduler has inserted a MI_BATCH_BUFFER_START command 430 into the ring buffer. The command has a graphics virtual address 436 which points to the batch buffer 432 in the graphics memory that is to be executed by the GPU. The batch buffer may be in the ring buffer allocation of the graphics memory, in another part of the graphics memory, as shown, or in another location.

The MI_ARB_CHK or arbitration command, mentioned above, may be programmed throughout the batch buffer at periodic intervals. As examples, it may be inserted into the batch buffer instruction sequence after every 3DPRIMITIVE command, that is a command to render a three-dimensional primitive or simple shape. A typical batch buffer contains many 3DPRIMITIVE commands and the 3DPRIMITIVE command in itself creates a large workload for the GPU to execute. The completion of a 3DPRIMITIVE command presents a frequent opportunity to check the UHPTR 421 and is a convenient possible preemption point. Other or additional commands may be used or the MI_BATCH_BUFFER_START command may be inserted into the instruction sequence in other or additional ways.

The MI_BATCH_BUFFER_START command 430 points to a set of batch buffer instructions 432 that are to preempt the execution of the normal ring buffer instructions 414. The GPU stores a ring buffer preempt address 442 upon being interrupted. This allows it to return to the interrupted sequence of instructions 418 after the batch buffer instructions are completed.

The batch buffer start address 436 indicates the location of the first instruction in the batch buffer that is called by the batch buffer start command 430. The GPU begins at the start address and executes the sequence of instructions 432 that are in the batch buffer. These instructions are executed until the GPU reaches an instruction line that indicates the end of the batch buffer, in this case labeled MI_BATCH_BUFFER_END 444. At this point the system returns to the ring buffer command following the MI_BATCH_BUFFER_START at 430 to resume the interrupted instruction sequence in the ring buffer. The ring buffer as described works using a head offset 408 and a tail offset 410. These two values indicate a distance from the starting address 406. In this example, the values wrap back to the start address upon reaching the wrap point 412 which is the end of the ring buffer. The batch buffer, on the other hand, operates using a start address 436 and an end instruction line 444.

FIG. 4 shows two different mechanisms for preempting an instruction sequence in the ring buffer. The first mechanism is the one described above with respect to FIG. 2. At appropriate points during execution of the ring buffer, the GPU checks the status of the update head pointer 421. In the example of FIG. 2, an arbitration check command is inserted into the ring buffer instruction sequence. When the execution reaches the arbitration check command, then the GPU checks the UHPTR. This allows the scheduler to control when an instruction sequence can be preempted. It also allows the UHPTR to be updated during the execution of a context. After the UHPTR is updated, the context will be preempted as soon as it reaches the next arbitration command. As mentioned with respect to FIG. 2, when the GPU is preempted, the head offset 408 is increased by the amount of the UHPTR 421 to a new location 418 which is the start of the new context 420. The tail offset 410 is also updated at 424 by increasing it by the size of the new context 420. The current address 442 in the ring buffer before preemption is stored to allow the previous context to continue after the new context is completed.

The other mechanism uses a batch buffer start command inserted into the instruction sequence. This command may be inserted by the scheduler to interrupt the sequence or it may be inserted by the programmer to invoke a subroutine, make a call to a related context or for any of a variety of other reasons. The batch buffer start command provides a convenient mechanism to invoke commonly used code sequences during the execution of any context. The sequences may be stored outside of the ring buffer. FIG. 4 shows that the batch buffer may also support a preemption mechanism. The instructions 432 are in part executed and in part preempted. The preemption may be controlled using the update head pointer 421 as with the ring buffer. The arrows of FIG. 4 suggest that the batch buffer instruction contain an arbitration command which caused the GPU to check the update head pointer 421. The execution then moved from an address 440 in the batch buffer at which execution was preempted to the new context 420 indicated by the update head pointer. The batch buffer preempt address can be saved so that execution of the batch buffer can recover after the new context has been executed.

Figure 5A:
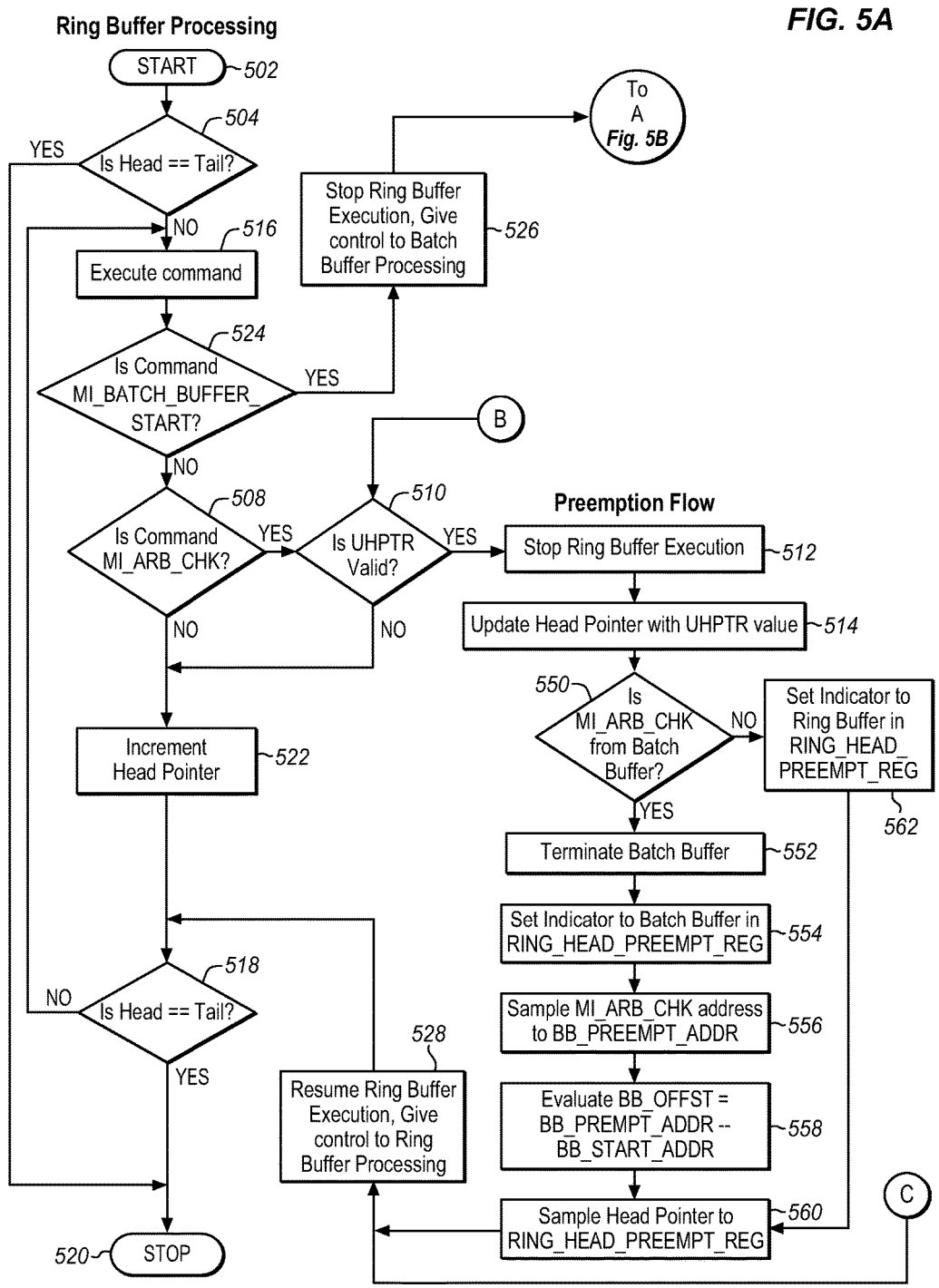
FIGS. 5A and 5B show a process flow diagram of batch buffer execution and preemption using a ring buffer and a batch buffer according to an embodiment of the present invention.
Figure 5B:
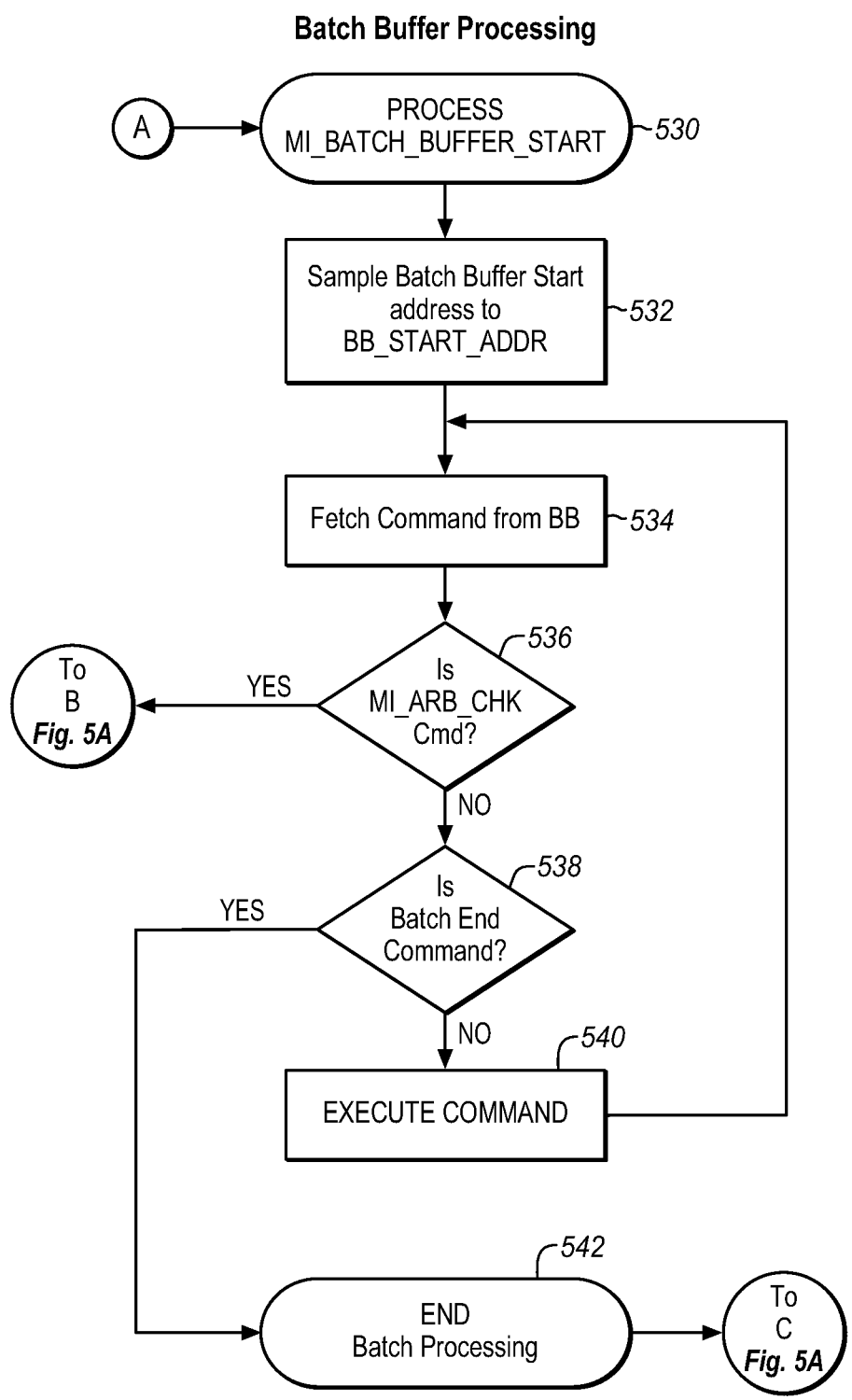

FIG. 5 is a process flow diagram of batch buffer execution and preemption using a ring buffer and a batch buffer. At 502 a start command is executed by the GPU and the GPU first determines whether there are any commands in the ring buffer. At 504 the head offset is compared to the tail offset. If they are equal, then the ring buffer is empty and the process stops 520. It begins again with another start command 502. If the tail offset is distanced from the head offset, then there are instructions to execute between the pointers. At 506 the GPU starts to execute those instructions.

If the instruction is not a batch buffer start command 524 and it is not an arbitration check command 508, then, after the command is executed, the head pointer is incremented at 522, the head pointer and the tail pointer are again compared at 518 and the GPU returns to process the next command.

If the command is a batch buffer start command at 524, then at 526 ring buffer processing stops and processing goes to the batch buffer. At 530, batch buffer processing starts. At 532, the batch buffer start address is sampled and stored. Using this address, the first batch buffer command may be fetched from the batch buffer at 534. If this command is not an arbitration check command and if the command is not a batch buffer end command at 538, then the command is executed at 540. The process then returns to fetch the next batch buffer command at 534. When the next command is a batch buffer end command at 540, then batch buffer processing ends at 542 and the process goes back to ring buffer processing at 516. With ring buffer processing the head and tail pointers are compared at 518 and if they do not match, then the next ring buffer command is executed at 506.

On executing a MI_ARB_CHK command 536 in the batch buffer 432 or an MI_ARB_CHK command in the ring buffer 404 at 508, the GPU checks to determine if there is a valid address in the UHPTR 421 at 510. With a valid UHPTR, the GPU stops executing the batch buffer or ring buffer, respectively, at 512 and updates the head pointer using the value in the update head offset pointer register at

514. This causes the system to take the next command from the new context indicated by the update head pointer instead of taking the next command in sequence from the context or batch buffer that was executing.

At 516, the GPU starts execution from the updated Head Pointer location. This location will correspond to the new context 220 that the scheduler added to the ring buffer. Execution continues in the ring buffer with the new context and the GPU after each instruction determines whether there are any further instructions at 518. If so, then execution continues as described above and the GPU executes the next command at 506. If the next command is not the MI_ARB_CHK command at 508, then the GPU increments the head pointer 522 and checks to determine whether there are any further commands at 504.

At 550 if the arbitration check command was in the batch buffer, then the GPU terminates the batch buffer execution process at 552. The GPU samples the batch buffer's graphics memory address corresponding to the MI_ARB_CHK command on which preemption has occurred to a BB_PREEMPT_ADDR register at 514. The BB_PREEMPT_ADDDR register is used in this example to store the address at which an instruction sequence was interrupted.

At 558, based on the batch buffer start address and the batch buffer preemption address, BB_PREEMPT_ADDR, values, the GPU evaluates the offset in the batch buffer at which preemption has occurred and saves it as contents of a batch buffer offset, BB_OFFSET, register. At 560, the GPU samples the head offset of the ring buffer on preemption before getting updated with UHPTR and updates a ring buffer head preemption address, RING_BUFFER_HEAD_PREEMPT_ADDR register. The batch buffer offset register is part of the context state and gets saved when the preempted context is switched out before executing a new workload.

When preemption occurs on an arbitration check, MI_ARB_CHK, command in the ring buffer at 508, a ring buffer head offset preemption, RING_BUFFER_HEAD_PREEMPT_REG, register is loaded at 562 with the head offset corresponding to MI_ARB_CHK command in the ring buffer. In the described embodiment, the RING_BUFFER_HEAD_PREEMPT_ADDR has a bit field which indicates whether the preemption has occurred in the ring buffer or the batch buffer. The scheduler looks at the RING_BUFFER_HEAD_PREEMPT_REG and BB_PREEMPT_ADDR appropriately based on this bit to infer the preemption point in the ring buffer and the batch buffer.

As shown in FIG. 5, if there are commands to execute at 504, the GPU will execute commands at 516, increment the head pointer at 522, check the incremented head pointer against the tail pointer at 504 and continue to execute commands at 508 if and until the ring buffer is emptied. The process is interrupted only for the MI_BATCH_BUFFER_START command at 524 and the MI_ARB_CHK command at 508 and then only if the command has a valid UHPTR value at 510. This register value points to the new context. Without this information, the context cannot be switched.

Resubmission of Preempted Context

When a context is getting preempted, the scheduler can resubmit the preempted context at a later point to allow the GPU to continue executing the preempted context after the new context is completed. As execution continues, the graphics driver detects the preempted context getting resubmitted and in one embodiment is able to submit a batch buffer start, MI_BATCH_BUFFER_START, command with an "Add Offset Enable" field set. This is shown in the example of FIG. 6.

Figure 6:
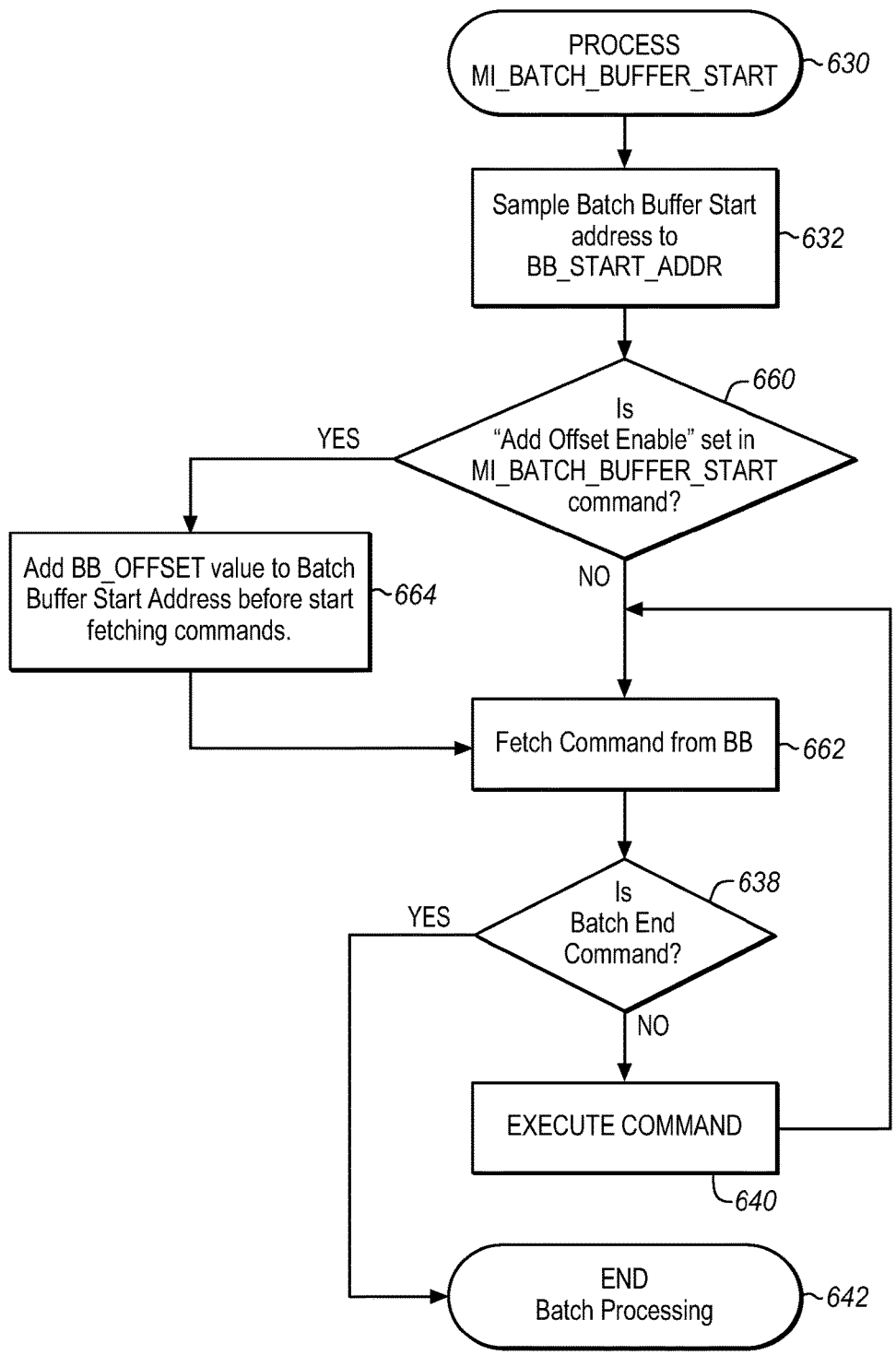
FIG. 6 is a process flow diagram of batch buffer processing using an offset addition value according to an embodiment of the present invention.

FIG. 6 is a process flow diagram of batch buffer processing using an offset addition value. The operations of FIG. 6 may be used as an alternative or addition to the batch buffer processing operations 530 to 542 of FIG. 5. As in FIG. 5, batch buffer processing begins with a start command 630 that may be a command in the ring buffer that provides the start address for the beginning of the batch buffer. At 632, the start address from the start command is sampled to a start address, BB_START_ADDR, register.

As mentioned above, on resubmission of the preempted context to the GPU by the scheduler, the GPU restores the context state that was saved when the context was preempted. The batch buffer offset, BB_OFFSET, register may also be restored as part of restoring the context. When the GPU executes the MI_BATCH_BUFFER_START command with an "Add Offset Enable" field set at 660, it adds the BB_OFFSET register contents to the batch buffer start address in MI_BATCH_BUFFER_START command at 664. This happens before the GPU starts fetching commands in the preempted batch buffer sequence. This is the address corresponding to the first instruction to be fetched from batch buffer in memory. As a result, the GPU will skip all the commands that were executed earlier. The context will be resumed from the instruction and values at which the context was preempted.

As the preempted context is resumed, the GPU will fetch the next command at the updated address from the batch buffer at 662. If the next command is the batch buffer end, MI_BATCH_BUFFER_END, command, then at 638 execution will skip to the end of batch buffer processing at 642. The processing returns to ring buffer processing at 528. If the next command is not the end, then the command is executed at 640 and processing returns to fetch the next command at 662. This repeats until all of the preempted batch buffer instructions are executed at 642. The instruction sequence of FIG. 6 may also include, an arbitration check process 536 that may cause a second preemption of the batch buffer. Such a cycle may be included or it may be prevented for a resumption of the preempted batch buffer in order to allow the preempted batch buffer to be completed before it is preempted a second time.

The address offset enable bit feature of FIG. 6 may be included in the batch buffer processing of FIG. 5. The process flow of FIG. 3 may be combined with that of FIG. 6 or substituted for the ring buffer processing flow into FIG. 5 or vice versa. Any of a variety of other operations, routines, and connections may be added or removed from process flow of FIG. 5 depending on the particular implementation.

Figure 7:
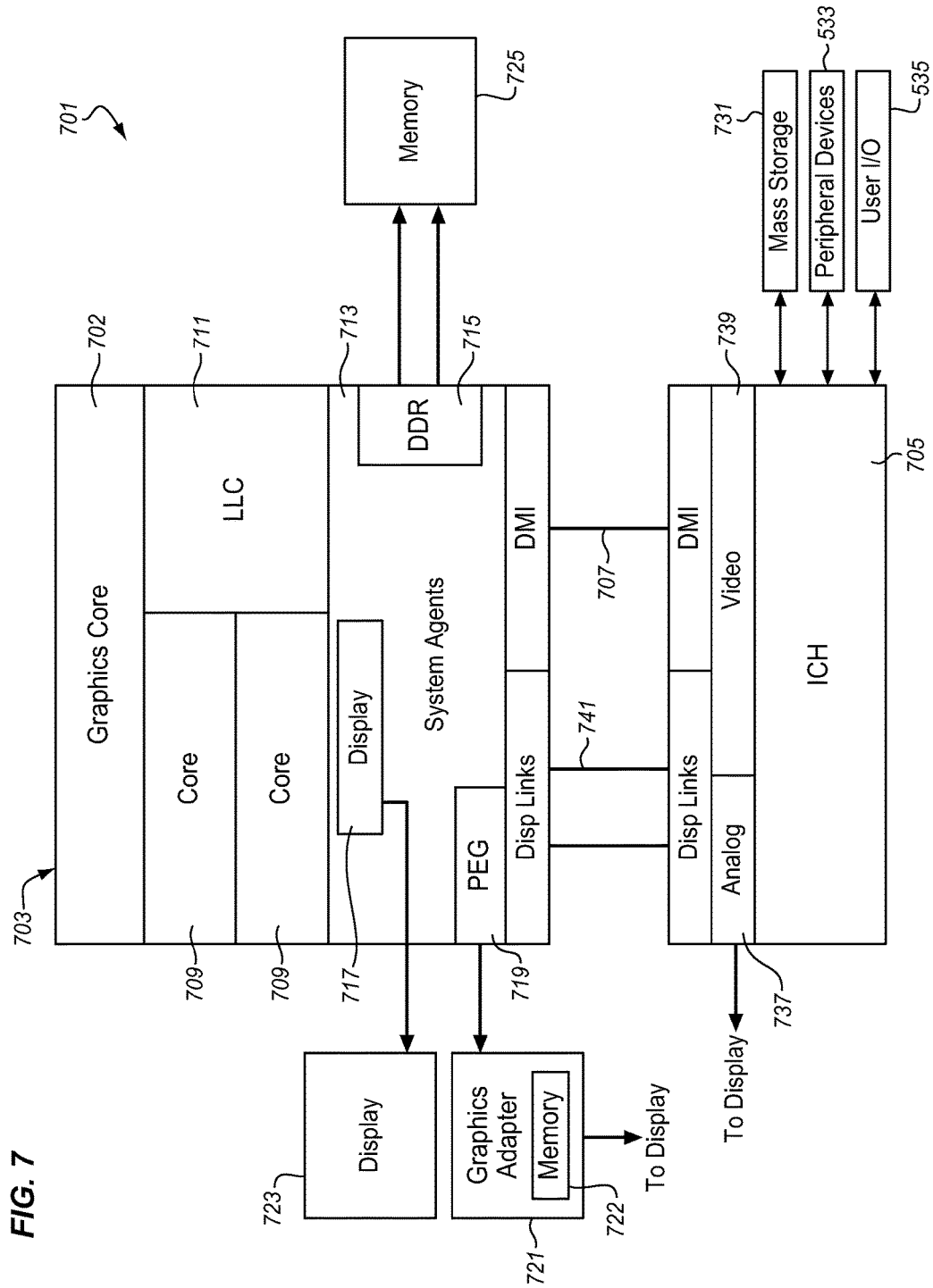
FIG. 7 is a block diagram of a computer system having one or more graphics processors and graphics memories according to an embodiment of the present invention.

Referring to FIG. 7, the graphics core 702 is shown as part of a larger computer system 701. The computer system has a CPU 703 coupled to an input/output controller hub (ICH) 705 through at DMI (Direct Media Interface) 707. The CPU has one or more cores for general purpose computing 709 coupled to the graphics core 702 and which share a Last Level Cache 711. The CPU includes system agents 713 such as a memory interface 715, a display interface 717, and a PCIe interface 719. In the illustrated example, the PCIe interface is for PCI express graphics and can be coupled to a graphics adapter 721 which can be coupled to a display (not shown). The graphics adapter may have its own memory 722 containing buffers, registers, and other components as described above. A second or alternative display 723 can be coupled to the display module of the system agent. This display will be driven by the graphics core 702. The memory interface 715 is coupled to system memory 725. This memory may be used by the graphics core 702 and contain one or more ring buffers, batch buffers and other registers as described above.

The input/output controller hub 705 includes connections to mass storage 731, external peripheral devices 733, and user input/output devices 735, such as a keyboard and mouse. The input/output controller hub may also include a display interface 737 and other additional interfaces. The display interface 737 is within a video processing subsystem 739. The subsystem may optionally be coupled through a display link 741 to the graphics core of the CPU.

A wide range of additional and alternative devices may be coupled to the computer system 701 shown in FIG. 7. Alternatively, the embodiments of the present invention may be adapted to different architectures and systems than those shown. Additional components may be incorporated into the existing units shown and more or fewer hardware components may be used to provide the functions described. One or more of the described functions may be deleted from the complete system.

While the graphics core 702 is shown as integrated with the CPU that also includes general processing cores 709 and other components, the graphics core may be constructed as a separate component with communication interfaces to the LLC 711, and general purpose cores. Alternatively, the graphics core and its related components may be constructed on a separate die that is enclosed in the same or a different package. Other components, such as the memory 725, ICH 705 and system agents 713 may also be constructed on the same or different dies in the same or different packages.

Embodiments of the present invention provide a mechanism to preempt instruction sequence in a shared 725 or discrete 721 memory using preemption, arbitration, and start commands. In the described example, this is done using particular commands and offset registers, however, the invention is not so limited. The commands and register values may be set by any one or more of the cores 702, 709, 721 under control of the operating systems, drivers, or software depending on the particular implementation.

A wide range of additional and alternative devices may be coupled to the computer system 701 shown in FIG. 7. Alternatively, the embodiments of the present invention may be adapted to different architectures and systems than those shown. Additional components may be incorporated into the existing units shown and more or fewer hardware components may be used to provide the functions described. One or more of the described functions may be deleted from the complete system.

It is to be appreciated that a lesser or more equipped system than the examples described above may be preferred for certain implementations. Therefore, the configuration of the exemplary systems and circuits may vary from implementation to implementation depending upon numerous factors, such as price constraints, performance requirements, technological improvements, or other circumstances.

Embodiments may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be implemented in varying physical styles or form factors. In some embodiments, for example, a small form factor device may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. Specifics in the examples may be used anywhere in one or more embodiments. In one embodiment, a method includes executing instructions of a first context at a graphics processor, the context having a sequence of instructions in an addressable buffer, at least one of the instructions being a preemption instruction, upon executing the preemption instruction, stopping execution of the first context before the sequence of instructions is completed, storing an address for an instruction with which the first context will be resumed, executing a second context, and upon completion of the execution of the second context, resuming the execution of the first context at the stored address.

In further embodiments, resuming the execution of the first context includes executing a start command indicating an address offset, and resuming execution at the address of the start command plus the address offset.

In further embodiments, the preemption instructions include a reference to an address for the second context. In further embodiments, the reference to an address comprises a reference to a pointer register, the method further includes checking the pointer register during the execution of the first context, and jumping to an address indicated by the pointer register, the address corresponding to a location of a first instruction of the second context.

In further embodiments, the reference to an address comprises a reference to a pointer register, the method further including checking the pointer register during the execution of the first context, jumping to an address indicated by the pointer register, the address indicating a first instruction of the second context, and executing the instructions of the second context from the first instruction to an end command in the instructions of the second context.

In further embodiments, the second context is stored in a second addressable buffer, and executing a second context include executing the instructions in the second buffer, and resuming execution of the first context include executing instructions in the first buffer.

In further embodiments, the preemption instruction includes an address in the second buffer corresponding to the first instruction of the second context in the second buffer.

Further embodiments include executing an end instruction in the second buffer and wherein resuming execution is performed in response to executing the end instruction.

In further embodiments, the instructions of the first context are executed from a ring buffer, the method further including receiving a preemption command to execute the second context before stopping execution of the first context, the preemption command indicating whether the second context is in the ring buffer or in a separate batch buffer.

In further embodiments stopping execution further includes storing the current state of the first context.

In further embodiments, the graphics processor updates a head offset register upon executing an instruction of the first context, and storing an address includes storing a current head offset register value.

In further embodiments, the preemption instruction includes a reference to a pointer register for the second context, the pointer register indicating an address offset from a first instruction of a buffer containing the first context to the first instruction of the second context, the second context being contained in the first buffer.

In further embodiments, the pointer register is updated asynchronously.

Further embodiments, include a tail offset register indicating an address offset from the first instruction of the buffer to the last address of the first context and executing a second context further includes updating the tail offset register to an address offset from the first instruction of the buffer to the last address of the second context.

In one embodiment, a computer-readable medium has instructions, that when executed by the computer, cause the computer to perform operations including executing instructions of a first context at a graphics processor, the context having a sequence of instructions in an addressable buffer, at least one of the instructions being a preemption instruction, upon executing the preemption instruction, stopping execution of the first context before the sequence of instructions is completed, storing an address for an instruction with which the first context will be resumed, executing a second context, and upon completion of the execution of the second context, resuming the execution of the first context at the stored address.

In further embodiments, resuming the execution of the first context includes executing a start command indicating an address offset, and resuming execution at the address of the start command plus the address offset.

In further embodiments, the second context is stored in a second addressable buffer, executing a second context includes executing the instructions in the second buffer, and resuming execution of the first context includes executing instructions in the first buffer.

In further embodiments, the preemption instruction includes an address in the second buffer corresponding to the first instruction of the second context in the second buffer.

In further embodiments, the instructions further include executing an end instruction in the second buffer and resuming execution is performed in response to executing the end instruction.

In further embodiments, the instructions of the first context are executed from a ring buffer, the instructions further including receiving a preemption command to execute the second context before stopping execution of the first context, the preemption command indicating whether the second context is in the ring buffer or in a separate batch buffer.

In further embodiments, stopping execution further includes storing the current state of the first context.

In another embodiment, an apparatus includes a graphics processor and an addressable graphics memory coupled to the graphics processor, the graphics memory having a ring buffer and a register to store an address. The graphics processor performs executing instructions of a first context, the context having a sequence of instructions in the ring buffer, at least one of the instructions being a preemption instruction, upon executing the preemption instruction, stopping execution of the first context before the sequence of instructions is completed, storing an address for an instruction with which the first context will be resumed, executing a second context, and upon completion of the execution of the second context, resuming the execution of the first context at the stored address.

In further embodiments, resuming the execution of the first context includes executing a start command indicating an address offset and resuming execution at the address of the start command plus the address offset.

In further embodiments, the preemption instructions include a reference to an address for the second context.

In further embodiments, the graphics memory further has a pointer register, and the reference to an address includes a reference to the pointer register, the graphics processor further checking the pointer register during the execution of the first context, and jumping to an address indicated by the pointer register, the address corresponding to a location of a first instruction of the second context.

In further embodiments, the graphics processor is further checking the pointer register during the execution of the first context, jumping to an address indicated by the pointer register, the address indicating a first instruction of the second context, and executing the instructions of the second context from the first instruction to an end command in the instructions of the second context.

Further embodiments include a batch buffer within the graphics memory and the instructions of the first context are executed from the ring buffer, the graphics processor further receiving a preemption command to execute the second context before stopping execution of the first context, the preemption command indicating whether the second context is in the ring buffer or in the batch buffer.

Further embodiments, include a head offset register within the graphics memory and the graphics processor updates the head offset register upon executing an instruction of the first context, and storing an address includes storing a current head offset register value.

In further embodiments, the graphics memory has a pointer register for the second context, the preemption instruction includes a reference to the pointer register for the second context, the pointer register indicates an address offset from a first instruction of a buffer containing the first context to the first instruction of the second context, the second context being contained in the ring buffer.

In further embodiments, the pointer register is updated asynchronously.

In further embodiments, the graphics memory further includes a tail offset register indicating an address offset from the first instruction of the buffer to the last address of the first context and executing a second context further includes updating the tail offset register to an address offset from the first instruction of the buffer to the last address of the second context.

What is claimed is:

1. A method comprising:
    setting a valid address in a pointer register to a buffer location by a scheduler, the addressed buffer location being a start of an instruction sequence of a second context;
    executing instructions of a first context at a graphics processor and incrementing a head pointer after the execution of each instruction, the head pointer indicating the location of a next instruction to be executed, the context having a sequence of instructions in a first addressable buffer, at least one of the instructions being a preemption instruction, the preemption instruction having a reference to the address in the pointer register that was set by the scheduler;
    updating the head pointer based on the address in the pointer register;
    upon executing the preemption instruction, stopping execution of the first context before the sequence of instructions is completed;
    storing an address for an instruction with which the first context will be resumed;
    executing the second context at the graphics processor based on the updated head pointer; and
    upon completion of the execution of the second context, resuming the execution of the first context at the stored address and updating the head pointer based on the stored address.

2. The method of claim 1, wherein said resuming the execution of the first context comprises:
    executing a start command indicating an address offset; and
    resuming execution at the address of the start command plus the address offset.

3. The method of claim 1, wherein the preemption instruction includes a reference to a start address for the second context.

4. The method of claim 1, further comprising:
    checking the pointer register during the execution of the first context; and
    jumping to an address indicated by the pointer register, the address corresponding to a location of a first instruction of the second context.

5. The method of claim 4, further comprising:
    checking the pointer register during the execution of the first context;
    jumping to an address indicated by the pointer register, the address indicating a first instruction of the second context; and
    executing the instructions of the second context from the first instruction to an end command in the instructions of the second context.

6. The method of claim 1, wherein the second context is stored in a second addressable buffer in the form of a ring buffer, wherein said executing a second context comprises executing the instructions in the second addressable buffer, and wherein said resuming execution of the first context comprises executing instructions in the first addressable buffer in the form of a batch buffer.

7. The method of claim 6, wherein the preemption instruction includes an address in the second addressable buffer corresponding to the first instruction of the second context in the second addressable buffer.

8. The method of claim 6, further comprising executing an end instruction in the second addressable buffer and wherein said resuming execution is performed in response to executing the end instruction.

9. The method of claim 1, wherein the instructions of the first context are executed from a ring buffer, the method further comprising receiving a preemption command to execute the second context before stopping execution of the first context, the preemption command indicating whether the second context is in the ring buffer or in a separate batch buffer.

10. The method of claim 1, wherein said stopping execution further comprises storing the current state of the first context.

11. The method of claim 1, wherein the graphics processor updates a head offset register upon executing an instruction of the first context, and wherein said storing an address comprises storing a current head offset register value.

12. The method of claim 11, wherein the preemption instruction includes a reference to a pointer register for the second context, the pointer register indicating an address offset from a first instruction of a buffer containing the first context to the first instruction of the second context, the second context being contained in the first addressable buffer.

13. The method of claim 12, wherein the pointer register is updated asynchronously.

14. A non-transitory computer-readable medium having instructions, that when executed by the computer, cause the computer to perform operations comprising:
    setting a valid address in a pointer register to a buffer location by a scheduler, the addressed buffer location being a start of an instruction sequence of a second context;
    executing instructions of a first context at a graphics processor by and incrementing a head pointer after the execution of each instruction, the head pointer indicating the location of a next instruction to be executed, the context having as sequence of instructions in as first addressable buffer, at least one of the instructions being a preemption instruction, the preemption instruction having a reference to the address in the pointer register that was set by the scheduling software;

updating the head pointer based on the address in the pointer register;

upon executing the preemption instruction stopping execution of the first context before the sequence of instructions is completed;

storm address for an instruction with which the first context will be resumed;

executing the second a second context at the graphics processor based on the updated head pointer; and upon completion of the execution of the second context, resuming the execution of the first context at the stored address and updating the head pointer based on the stored address.

15. The medium of claim 14, wherein said resuming the execution of the first context comprises:
    executing a start command indicating an address offset; and
    resuming execution at the address of the start command plus the address offset.

16. The medium of claim 14, wherein the instructions of the first context are executed from a ring buffer, the instructions further comprising receiving a preemption command to execute the second context before stopping execution of the first context, the preemption command indicating whether the second context is in the ring buffer or in a separate batch buffer.

17. An apparatus comprising:
    a graphics processor; and
    an addressable graphics memory coupled to the graphics processor and incrementing a head pointer after the execution of each instruction, the head pointer indicating the location of a next instruction to be executed, the graphics memory having a ring buffer, a pointer register, and a register to store an address,
    the graphics processor executing instructions of a first context, the context having a sequence of instructions in the ring buffer, at least one of the instructions being a preemption instruction, the preemption instruction having a reference to an address in a pointer register that was set by scheduling software, the address being a start of an instruction sequence of second context, updating the head pointer based on the address in the pointer register, upon executing the preemption instruction, stopping execution of the first context before the sequence of instructions is completed, storing an address for an instruction with which the first context will be resumed, executing the second context based on the updated head pointer, and upon completion of the execution of the second context, resuming the execution of the first context at the stored address and updating the head pointer based on the stored address.

18. The apparatus of claim 17, the graphics processor further:
    checking the pointer register during the execution of the first context; and
    jumping to an address indicated by the pointer register, the address corresponding to a location of a first instruction of the second context.

19. The apparatus of claim 17, further comprising a batch buffer within the graphics memory and wherein the instructions of the first context are executed from the ring buffer, the graphics processor further receiving a preemption command to execute the second context before stopping execution of the first context, the preemption command indicating whether the second context is in the ring buffer or in the batch buffer.

20. An apparatus comprising:
    a central processor;
    a scheduler to run on the central processor;
    a graphics processor; and
    an addressable shared memory coupled to the central processing unit and the graphics processor, the shared memory having a ring buffer and a register to store an address,
    the scheduler setting an address in a pointer register to a buffer location, the addressed buffer location being a start of an instruction sequence of a second context;
    the graphics processor executing instructions of a first context and incrementing a head pointer after the execution of each instruction, the head pointer indicating the location of a next instruction to be executed, the context having a sequence of instructions in the ring buffer, at least one of the instructions being a preemption instruction, the preemption instruction having a reference to the address in the pointer register that was set by the scheduling software, updating the head pointer based on the address in the pointer register, upon executing the preemption instruction, stopping execution of the first context before the sequence of instructions is completed, storing an address for an instruction with which the first context will be resumed, executing the second context based on the updated head pointer, and upon completion of the execution of the second context, resuming the execution of the first context at the stored address and updating the head pointer based on the stored address.

21. The apparatus of claim 20, further comprising a batch buffer of the addressable shared memory to store the second context and wherein the graphics processor executes the second context by executing the instructions in the batch buffer, wherein the preemption instruction includes an address in the batch buffer corresponding to the first instruction of the second context in the batch buffer.

* * * * *